United States Patent
Beltoft et al.

(10) Patent No.: US 10,989,173 B2
(45) Date of Patent: Apr. 27, 2021

(54) METHOD FOR ASSESSING PERFORMANCE IMPACT OF A POWER UPGRADE

(71) Applicant: VESTAS WIND SYSTEMS A/S, Aarhus N (DK)

(72) Inventors: Dan Beltoft, Risskov (DK); Sven Jesper Knudsen, Varde (DK); Carsten Krogh Nielsen, Hammel (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 309 days.

(21) Appl. No.: 15/772,793

(22) PCT Filed: Nov. 18, 2016

(86) PCT No.: PCT/DK2016/050374
§ 371 (c)(1),
(2) Date: May 1, 2018

(87) PCT Pub. No.: WO2017/088879
PCT Pub. Date: Jun. 1, 2017

(65) Prior Publication Data
US 2018/0320667 A1    Nov. 8, 2018

(30) Foreign Application Priority Data
Nov. 26, 2015  (DK) .............................. PA 201570767

(51) Int. Cl.
*F03D 17/00* (2016.01)
*F03D 7/04* (2006.01)

(52) U.S. Cl.
CPC ............. *F03D 17/00* (2016.05); *F03D 7/046* (2013.01); *F03D 7/048* (2013.01);
(Continued)

(58) Field of Classification Search
CPC .................................................... F03D 17/00
See application file for complete search history.

(56) References Cited

U.S. PATENT DOCUMENTS

2009/0183576 A1    7/2009  Honhoff et al.
2013/0073223 A1    3/2013  Lapira et al.
(Continued)

FOREIGN PATENT DOCUMENTS

CN    102208050 A    10/2011
EP    2469082 A2     6/2012
(Continued)

OTHER PUBLICATIONS

PCT Notification of Transmittal of the International Search Report and the Written Opinion of the International Searching Authority, or the Declaration for Application No. PCT/DK2016/050374 dated Feb. 1, 2017.

(Continued)

*Primary Examiner* — Manuel A Rivera Vargas
(74) *Attorney, Agent, or Firm* — Patterson + Sheridan, LLP

(57) ABSTRACT

Assessing performance impact of a power upgrade of one or more wind turbines of a wind farm that includes a group of target wind turbines and a group of reference wind turbines. For each of the target wind turbines, a transfer function is generated, establishing a relationship between the locally measured wind speed at the target wind turbine and locally measured wind speeds at each of the reference wind turbines. A power upgrade is performed on each of the target wind turbines, and subsequently power performance data is obtained for the reference wind turbines and the target wind turbines, within one or more wind speed intervals. For the target wind turbines, the wind speed intervals are based on estimated wind speeds, based on locally measured wind speeds at the reference wind turbines and the transfer functions.

20 Claims, 3 Drawing Sheets

(52) U.S. Cl.
CPC ..... *F05B 2230/80* (2013.01); *F05B 2260/821* (2013.01); *F05B 2260/83* (2013.01); *F05B 2270/32* (2013.01); *F05B 2270/335* (2013.01); *F05B 2270/504* (2013.01); *Y02E 10/72* (2013.01)

(56) References Cited

U.S. PATENT DOCUMENTS

| | | |
|---|---|---|
| 2014/0167416 A1 | 6/2014 | Perley et al. |
| 2016/0298607 A1* | 10/2016 | Gregg .................... F03D 9/257 |

FOREIGN PATENT DOCUMENTS

| | | |
|---|---|---|
| EP | 2631471 A1 | 8/2013 |
| WO | 2011101475 A2 | 8/2011 |
| WO | 2015077337 A1 | 5/2015 |
| WO | 2017088879 A1 | 6/2017 |

OTHER PUBLICATIONS

PCT Written Opinion of the International Searching Authority for Application No. PCT/20161050374 dated Nov. 18, 2016.
Danish Patent and Trademark Office First Technical Examination for Application PA 2015 70767 dated Aug. 25, 2016.
SIPO Notification of the First Office Action for Application No. 20160068771.1 dated Apr. 9, 2019.

* cited by examiner

METHOD FOR ASSESSING PERFORMANCE IMPACT OF A POWER UPGRADE

FIELD OF THE INVENTION

The present invention relates to a method for assessing performance impact of a power upgrade of one or more wind turbines of a wind farm.

BACKGROUND OF THE INVENTION

Wind turbines are normally provided with a rotor in the form of a rotatable hub carrying a set of wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

In order to improve the performance of existing wind turbines, one or more power upgrades may be performed on the wind turbine. The power upgrade(s) may, e.g., be in the form of hardware upgrade(s) and/or in the form of software upgrade(s). Hardware upgrades could, e.g., include replacement of the wind turbine blades, alterations of the aerodynamic profiles of the wind turbine blades, e.g. in the form of vortex generators, slats, auxiliary profiles, etc., replacement or alterations of other components of the wind turbine, etc. Software upgrades could, e.g., include upgrades of the control software of the wind turbine, etc.

Following a power upgrade of a wind turbine, it is desirable to be able to assess whether or not the performed power upgrade has resulted in an improved performance of the wind turbine, as well as to what extent the performance has been improved. However, a power upgrade may influence locally measured wind speeds, e.g. due to a change in the wind flow downstream relative to the rotor, where an anemometer or the like is often arranged. Furthermore, other conditions may change from a time period prior to the power upgrade to a time period after the power upgrade, e.g. wind conditions, weather conditions, temperature, humidity, etc. Therefore, a direct comparison of the performance of the wind turbine before the power upgrade is performed and after the power upgrade is performed, will often not provide reliable information regarding the impact on the performance of the wind turbine, due to the power upgrade.

WO 2015/077337 A1 discloses a method for assessing the performance impact of wind turbine upgrades. The method comprises determining a baseline power curve for a wind turbine prior to the wind turbine being upgraded and determining a baseline wind speed transfer function for the wind turbine prior to the wind turbine being upgraded, the wind speed transfer function relating a reference wind speed to a local wind speed for the wind turbine. The method may also include determining an upgraded wind speed transfer function for the wind turbine after the wind turbine is upgraded, and determining a corrected local wind speed for the wind turbine based on the baseline and upgraded wind speed transfer functions. An upgraded power curve for the wind turbine may be determined based on the corrected local wind speed.

DESCRIPTION OF THE INVENTION

It is an object of embodiments of the invention to provide a method for assessing performance impact of a power upgrade of one or more wind turbines, the method providing reliable information regarding the impact on the performance caused by the power upgrade.

It is a further object of embodiments of the invention to provide a method for assessing performance impact of a power upgrade of one or more wind turbines, in which it is ensured that reliable wind data is available at all times.

The invention provides a method for assessing performance impact of a power upgrade of one or more wind turbines of a wind farm, the method comprising the steps of:

dividing at least some of the wind turbines of the wind farm into a group of target wind turbines and a group of reference wind turbines, operating the wind turbines of the wind farm, while obtaining locally measured wind speeds at each of the wind turbines, for each of the target wind turbines, generating a transfer function establishing a relationship between the locally measured wind speed at the target wind turbine and the locally measured wind speeds at each of the reference wind turbines, performing a power upgrade of each of the target wind turbines, operating the wind turbines of the wind farm, while obtaining locally measured wind speeds, at least at the reference wind turbines, obtaining power performance data for each of the reference wind turbines, within one or more wind speed intervals, based on locally measured wind speeds at the reference wind turbines, obtaining power performance data for each of the target wind turbines, within the one or more wind speed intervals, based on estimated wind speeds obtained by means of locally measured wind speeds at each of the reference wind turbines and the previously generated transfer functions for each of the target wind turbines, comparing the obtained power performance data for the reference wind turbines and for the target wind turbines, and assessing a performance impact of the power upgrade, based on the comparison.

Thus, the invention relates to a method for assessing performance impact of a power upgrade of one or more wind turbines of a wind farm. In the present context, the term 'power upgrade' should be interpreted to mean a deliberate action, performed in order to improve the power output of the wind turbine(s). Accordingly, the method according to the invention is for assessing whether or not, and to what extent, a performed power upgrade has resulted in an improvement of the performance of the wind turbine(s).

In the present context, the term 'wind farm' should be interpreted to mean a group of wind turbines, arranged within a site, i.e. a well defined geographical area. The wind farm may be arranged on-shore or off-shore. The wind turbines of a wind farm are sometimes at least partly controlled dependently of each other. Wind farms are also sometimes referred to as 'wind power plants' or 'wind parks'.

According to the method of the invention, at least some of the wind turbines of the wind farm are initially divided into a group of target wind turbines and a group of reference wind turbines. This may involve all of the wind turbines of the wind farm, in which case each of the wind turbines of the wind farm is assigned to either the group of target wind turbines or to the group of reference wind turbines. As an alternative, some of the wind turbines of the wind farm may be omitted, in which case these wind turbines are neither assigned to the group of target wind turbines, nor to the group of reference wind turbines. However, none of the wind turbines of the wind farm will be assigned to the group of target wind turbines as well as to the group of reference wind turbines.

The positions of the target wind turbines and the reference wind turbines, respectively, within the site of the wind farm may be mixed in the sense that the target wind turbines as well as the reference wind turbines are distributed across the site of the wind farm. As an alternative, the target wind turbines and/or the reference turbines may be arranged in a specific part of the site of the wind farm.

Next, the wind turbines of the wind farm are operated, in a normal manner, while locally measured wind speeds are obtained at each of the wind turbines. The local wind speeds may, e.g., be obtained by means of measurement devices, such as anemometers, arranged at or near each of the wind turbines.

For each of the target wind turbines, a transfer function is then generated. The transfer function establishes a relationship between the locally measured wind speed at the target wind turbine and the locally measured wind speeds at each of the reference wind turbines. Thus, the transfer function for a given target wind turbine can be used for estimating or calculating the wind speed which is measured locally at the target wind turbine, based on locally measured wind speeds at the reference wind turbines. Furthermore, since the transfer function is generated while the wind turbines are operated in a normal manner, and before any power upgrades have been performed, the transfer function reflects an actual relationship between the measured wind speeds, as it occurs prior to performing power upgrades. This period of time may be referred to as a 'training period'.

Next, a power upgrade is performed on each of the target wind turbines, while the reference wind turbines are left unchanged.

Following the power upgrade of the target wind turbines, the wind turbines of the wind farm are once again operated, in a normal manner, while locally measured wind speeds are obtained, at least at each of the reference wind turbines. Locally measured wind speeds may further be obtained at the target wind turbines. This period of time may be referred to as a 'test period'.

During the operation of the wind turbines, following the power upgrade of the target wind turbines, power performance data is obtained for each of the reference wind turbines and for each of the target wind turbines.

The power performance data for the reference wind turbines is obtained within one or more wind speed intervals, based on locally measured wind speeds at the reference wind turbines. Thus, with regard to the power performance data of the reference wind turbines, the locally measured wind speeds, measured at the respective reference wind turbines, are relied upon for defining the wind speed intervals.

However, the power performance data of the target wind turbines is obtained within the one or more wind speed intervals, based on estimated wind speeds obtained by means of locally measured wind speeds at each of the reference wind turbines and the previously generated transfer functions, for the respective target wind turbines. Thus, with regard to the power performance data of the target wind turbines, locally measured wind speeds are not relied upon. Instead, estimated values of the local wind speed, based on the transfer functions and the measured wind speeds at the reference wind turbines are relied upon for providing the wind speeds required for the power performance data. Thereby any influence which the power upgrade may have on the locally measured wind speed at the target wind turbines, are not reflected in the obtained power performance data for the target wind turbines. Accordingly, the obtained power performance data for the reference wind turbines and for the target wind turbines can be readily compared in order to allow the performance impact resulting from the power upgrade to be reliably assessed.

Accordingly, the obtained power performance data for the reference wind turbines and for the target wind turbines are then compared, and the performance impact of the power upgrade is assessed, based on the comparison.

It is an advantage that the transfer functions for each of the target wind turbines are generated based on locally measured wind speeds at the reference wind turbines, because this allows separate measurement stations, e.g. in the form of metmasts, for providing reference wind speed data to be avoided. Furthermore, since the transfer function relies on measured wind speeds from a plurality of measurement devices, reliable measurements can be obtained, even if one or more of the measurement devices malfunctions or is unavailable. Finally, a statistically reliable result is obtained.

The step of performing a power upgrade may comprise performing a hardware upgrade and/or a software upgrade of the target wind turbines.

As described above, hardware upgrades could, e.g., include replacement of the wind turbine blades, alterations of the aerodynamic profiles of the wind turbine blades, e.g. in the form of vortex generators, slats, auxiliary profiles, etc., replacement or alterations of other components of the wind turbine, etc. Software upgrades could, e.g., include upgrades of the control software of the wind turbine, etc.

The step of generating a transfer function may comprise training a learning algorithm. According to this embodiment, the transfer functions for the respective target wind turbines are generated gradually, during a period of time, and the transfer functions are obtained on the basis of empirical wind speed data, collected during a time period which is sufficiently long to provide a statistically reliable foundation for estimating local wind speeds at the target wind turbines.

Alternatively or additionally, the step of generating a transfer function may be performed using a linear regression method.

The object of the transfer function for a given target wind turbine is to be able to estimate or predict the local wind speed at the target wind turbine, based on the locally measured wind speeds at the reference wind turbines. The transfer function for the i'th target wind turbine, may advantageously be of the form:

$$\hat{v}_{it} = f_i(X_R),$$

where $\hat{v}$ denotes the estimated wind speed, $f_i$ is a predictor function for the i'th target wind turbine, and $X_R$ represents the reference wind speed data obtained from the reference wind turbines. Assuming that there are $n_R$ reference wind turbines, a linear regression of target wind speeds on reference wind speeds, obtaining $n_R$ fitted linear regression functions may, e.g., be created. A single wind speed score may then be synthesized as the average of the predicted values:

$$\hat{v}_{it} = \frac{1}{n_R} \sum_{j \in R} (a_{ij} + b_{ij} v_{ij}),$$

where $a_{ij} + b_{ij} v_{ij}$ denotes the j'th reference prediction at time t.

As an alternative, multiple regression of the target wind speed, using all reference wind turbine wind speeds as regressors, may be used.

The group of target wind turbines may comprise at least two target wind turbines and/or the group of reference wind turbines may comprise at least two reference wind turbines. Preferably, the group of target wind turbines as well as the group of reference wind turbines comprises a plurality of wind turbines. However, the present invention should also be regarded as covering methods in which the group of target wind turbines comprises only one wind turbine and/or the group of reference wind turbines comprises only one reference wind turbine.

The group of target wind turbines and the group of reference wind turbines may in combination include substantially all of the wind turbines of the wind farm. According to this embodiment, each of the wind turbines in the wind farm is associated with either the group of reference wind turbines or with the group of target wind turbines.

As an alternative, some of the wind turbines of the wind farm may be omitted from the process. For instance, some of the wind turbines of the wind farm may for some reason produce wind speed measurements and/or power performance data which are not representative for the wind turbines of the wind farm in general. Thereby, data obtained by such wind turbines may in fact disturb or degrade the generated transfer functions, rather than contributing to the statistical reliability of the transfer function, and a more reliable transfer function is obtained if such wind turbines are omitted. The omitted wind turbines could, e.g., be arranged in parts of the site of the wind farm where special conditions occur, e.g. in terms of terrain, wind wake, turbulence, wind shear, etc. Alternatively or additionally, the omitted wind turbines may be of a different type than the wind turbines associated with the group of target wind turbines or with the group of reference wind turbines.

The number of target wind turbines may be substantially equal to the number of reference wind turbines. For instance, approximately half of the wind turbines of the wind farm may be associated with the group of reference wind turbines, and approximately half of the wind turbines of the wind farm may be associated with the group of target wind turbines.

The target wind turbines and the reference wind turbines may be distributed across the site of the wind farm in such a manner that the target wind turbines and the reference wind turbines are mixed among each other. The distribution of the wind turbines may, e.g., be selected in such a manner that uncertainties in the transfer functions are minimised.

Thus, the target wind turbines and the reference wind turbines may be spatially distributed among each other within the wind farm.

The estimated wind speeds, obtained by means of locally measured wind speeds at each of the reference wind turbines and the previously generated transfer functions, may be obtained using a synthesis function reducing the estimates for each reference wind turbine to each target wind turbine to one estimate. The synthesis function could, e.g., be a simple average, median, geometric mean or another simple aggregator.

Thus, the synthesis function may be an average or a weighted average per wind speed interval. In the case that the synthesis function is a weighted average, the weights could, e.g., be calculated or selected based on the distances between each of the reference wind turbines and the target wind turbine in question. For instance, the weights could be (1/distance) or (1/distance*the uncertainty of the transfer function). Thereby the wind speed measurements from the reference wind turbines which are arranged close to the target wind turbine in question are given more weight than the wind speed measurements from the reference wind turbines which are arranged far from the target wind turbine. However, a simple average may instead be used, or the weights may be calculated or selected in another manner, e.g. taking specific conditions at the site, such as wind wake, expected turbulence, expected wind shear, hills and valleys, etc., into account.

For instance, the synthesis function may include Kriging as a method of interpolation. In this case a surface is fitted to the wind speed data, and an interpolation to the location of interest, i.e. the location of the target wind turbine, is performed. Ordinary Kriging is basically a weighted average over spatially distributed data, where the weights are estimated by spatial correlation. Universal Kriging assumes a polynomial surface instead of the average, and thin plate splines versions also exist. The synthesis method may, alternatively, be in the form of a regression learning algorithm or a spatio-temporal dynamical model.

The method may further comprise the step of, for each of the target wind turbines, generating a power transfer function establishing a relationship between the obtained power performance data of the target wind turbine and the power performance data of each of the reference wind turbines.

According to this embodiment, a second transfer function, i.e. a power transfer function, is generated for each of the target wind turbines. This second transfer function establishes a relationship between the obtained power performance date of the target wind turbine and the obtained power performance data of each of the reference wind turbines, rather than establishing a relationship between the locally measured wind speeds. Thereby the performance impact of the power upgrade may be assessed on the basis of a comparison between estimated power performance data, obtained using the second transfer function, and measured power performance data.

The step of obtaining power performance data for the reference wind turbines may comprise obtaining annual energy production data for the reference wind turbines and/or the step of obtaining power performance data for the target wind turbines may comprise obtaining annual energy production data for the target wind turbines.

The annual energy production for a wind turbine represents the amount of energy which the wind turbine is able to produce during a year. Since energy production of a wind turbine may very well vary from one season to another, the annual energy production provides an appropriate measure for the level of energy which an owner of the wind turbine may expect the wind turbine to produce.

Alternatively or additionally, the step of obtaining power performance data for the reference wind turbines and/or the target wind turbines may include generating power curves.

The one or more wind speed intervals may contain wind speeds within a range from a cut-in wind speed to a nominal wind speed. In the present context, the term 'nominal wind speed' should be interpreted to mean a wind speed at which the nominal power output of the wind turbine is produced. The wind speed range from the cut-in wind speed to the nominal wind speed is sometimes referred to as the partial load region. Many wind turbines are designed in such a manner that they operate in this region most of the time. Furthermore, once the nominal wind speed has been reached, the wind turbine will be operated in such a manner that the nominal power is produced by the wind turbine. Therefore, the partial load region is the region where a power upgrade is expected to have the most significant impact on the performance of the wind turbine.

The transfer function may further be calculated per a number of different wind direction sectors. The performance of a given wind turbine in a wind farm may vary significantly, depending on the direction of the wind, e.g. due to wind wake effect, variations in the landscape, etc. It may therefore be advantageous to the take the direction of the wind into account when generating the transfer function.

According to one embodiment, the power performance data for a number of target wind turbines may be combined in order to increase the statistical strength of the comparison, and thereby of the assessment of the performance impact of the power upgrade.

The power upgrade performed on the target wind turbines need not be the same power upgrade for all of the target wind turbines. For instance, for some of the target wind turbines the control software may be upgraded, while some of the other wind turbines may have vortex generators retrofitted onto the wind turbine blades. As an alternative, all of the target wind turbines may have the same power upgrade performed thereto.

The method may further comprise the step of performing the power upgrade on each of the reference wind turbines in the case that the step of assessing the performance impact of the power upgrade reveals that the power upgrade results in an improvement of the performance of the target wind turbines.

According to this embodiment, if it turns out that the power upgrade actually has a positive impact on the performance of the target wind turbines, it may be concluded that the power upgrade is appropriate and provides a desired result. It may therefore be considered appropriate to perform the power upgrade on the rest of the wind turbines of the wind farm, i.e. on the reference wind turbines.

BRIEF DESCRIPTION OF THE DRAWINGS

The invention will now be described in further detail with reference to the accompanying drawings in which.

DETAILED DESCRIPTION OF THE DRAWINGS

Figure 1:
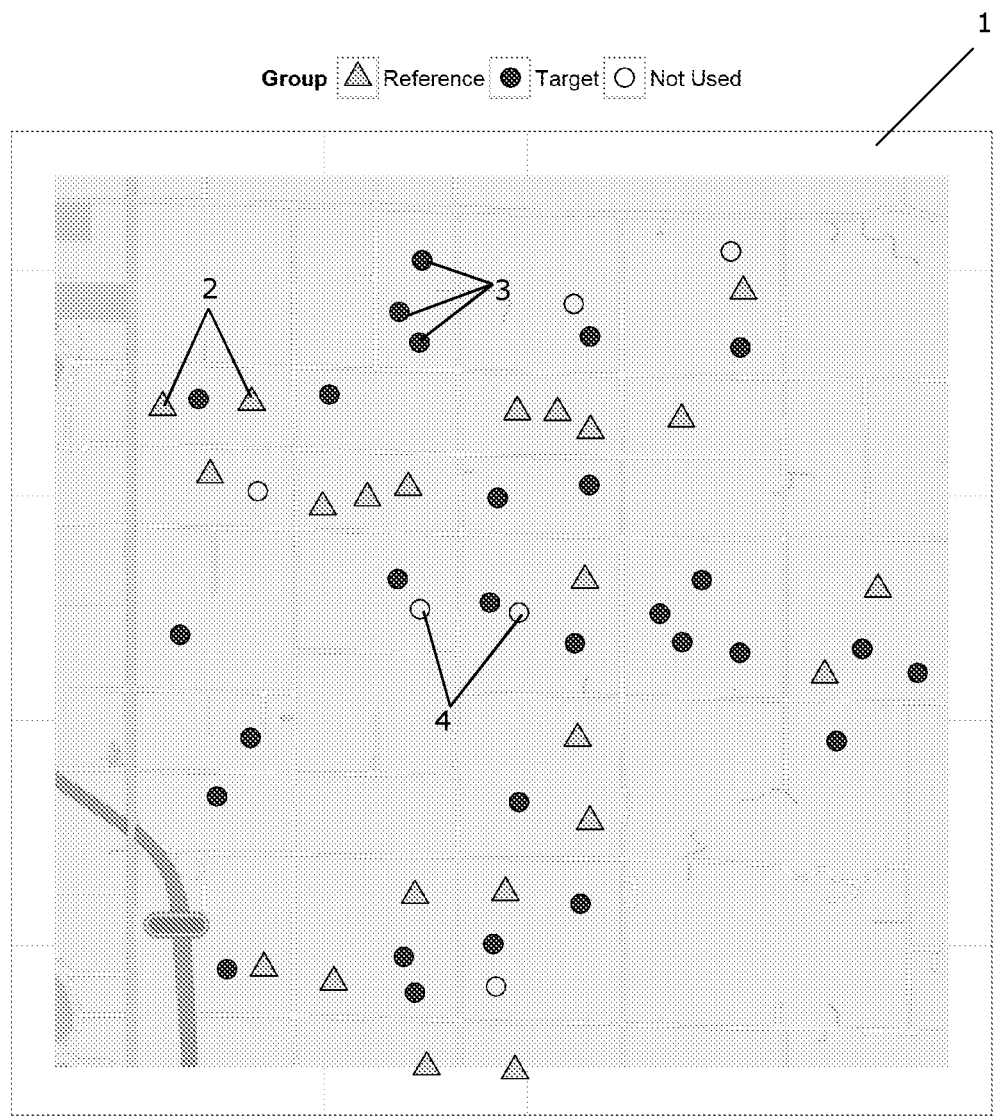
FIG. 1 shows a layout of a wind farm comprising target wind turbines and reference wind turbines.

FIG. 1 shows a layout of a wind farm 1 comprising a plurality of wind turbines 2, 3, 4. Almost all of the wind turbines 2, 3, 4 of the wind farm 1 have been divided into a group of reference wind turbines 2 and a group of target wind turbines 3. The positions of the reference wind turbines 2 are marked with triangles, and the positions of the target wind turbines 3 are marked with filled circles. It can be seen that the reference wind turbines 2 as well as the target wind turbines 3 are distributed across the entire site of the wind farm 1, and the reference wind turbines 2 and the target wind turbines 3 are thereby arranged among each other.

A small number of wind turbines 4 are marked by open circles. These wind turbines 4 are not used for performing the method according to the invention. This may, e.g., be because these wind turbines 4 are knows to produce wind speed measurements and/or power performance data which are not representative for the wind speed measurements and/or power performance data of the wind turbines of the wind farm 1 in general. It is therefore not appropriate to include the data from these wind turbines 4 when performing the method of the invention.

As described above, when the wind turbines 2, 3, 4 of the wind farm 1 have been divided into the group of reference wind turbines 2, the group of target wind turbines 3 and the group wind turbines 4 which are not used, the wind turbines 2, 3, 4 of the wind farm 1 are operated in a normal manner, while obtaining locally measured wind speeds at each of the reference wind turbines 2 and each of the target wind turbines 3.

Next, a transfer function is generated, for each of the target wind turbines 3. The transfer function establishes a relationship between the locally measured wind speed at the target wind turbine 3 and the locally measured wind speeds at each of the reference wind turbines 2. Thereby, a local wind speed at a given target wind turbine 3 can be estimated on the basis of measured wind speeds at the reference wind turbines 2, using the transfer function associated with the target wind turbine 3.

Once the transfer functions have been generated, a power upgrade is performed on each of the target wind turbines 3. The power upgrade could, e.g., be a hardware upgrade and/or a software upgrade, as described above.

Following the power upgrade of the target wind turbines 3, the wind turbines 2, 3, 4 are once again operated in a normal manner, while locally measured wind speeds are obtained, at least at the reference wind turbines 2.

During operation of the wind turbines 2, 3, 4, power performance data is obtained for each of the reference wind turbines 2 and for each of the target wind turbines 3. The power performance data for the reference wind turbines 2 is obtained within one or more wind speed intervals, based on the locally measured wind speeds at the reference wind turbines 2. The power performance data for the target wind turbines 3 is also obtained within the one or more wind speed intervals, but based on estimated wind speeds obtained by means of locally measured wind speeds at each of the reference wind turbines 2 and the previously generated transfer functions. Accordingly, any impact on the locally measured wind speeds at the target wind turbines 3, caused by the power upgrade, will not affect the obtained power performance data of the target wind turbines 3, and therefore the power performance data of the reference wind turbines 2 and the power performance data of the target wind turbines 3 are readily comparable.

Accordingly, the obtained power performance data for the reference wind turbines 2 and for the target wind turbines 3 are compared, and the performance impact of the power upgrade is assessed, based on the comparison.

In the case that the assessment of the performance impact reveals that the power upgrade has a positive impact on the power performance of the target wind turbines 3, the power upgrade may be performed on the reference wind turbines 2 as well.

Figure 2:
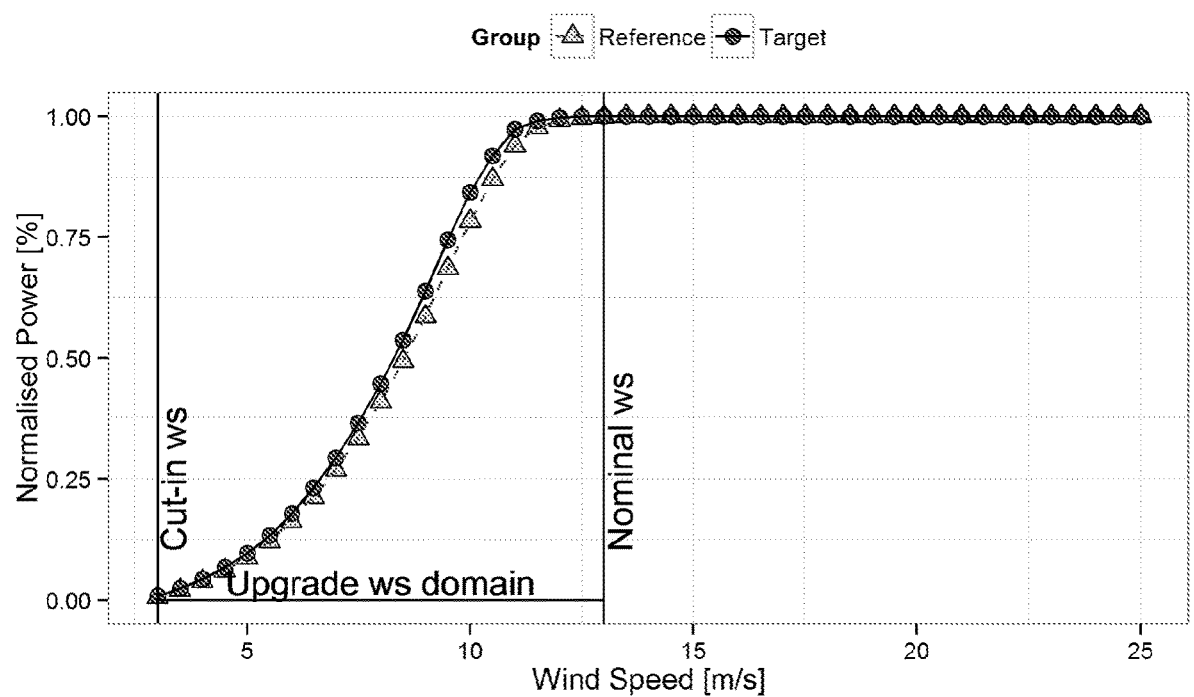
FIG. 2 shows power curves for target wind turbines and reference wind turbines, respectively.

FIG. 2 shows power curves for target wind turbines and reference wind turbines, respectively. More particularly, the curves of FIG. 2 illustrate normalised power output of the wind turbines as a function of wind speed. The power curves may, e.g., be generated on the basis of power performance data obtained from the reference wind turbines 2 and the target wind turbines 3 of the wind farm 1 of FIG. 1.

The curve marked with triangles is generated on the basis of power performance data obtained from a group of reference wind turbines, and the curve marked with circles is generated on the basis of power performance data obtained from a group of target wind turbines, after a power upgrade, in the manner described above.

In the partial load region, i.e. in the wind speed region between a cut-in wind speed and a nominal wind speed, i.e. a wind speed corresponding to nominal output power, the normalised power output of the target wind turbines is generally higher than the normalised power output of the reference wind turbines, at a given wind speed. Accordingly, comparing the two curves of FIG. 2 reveals that the power upgrade performed on the target wind turbines has a positive impact on the performance of the target wind turbines, at least in the partial load region.

Figure 3:
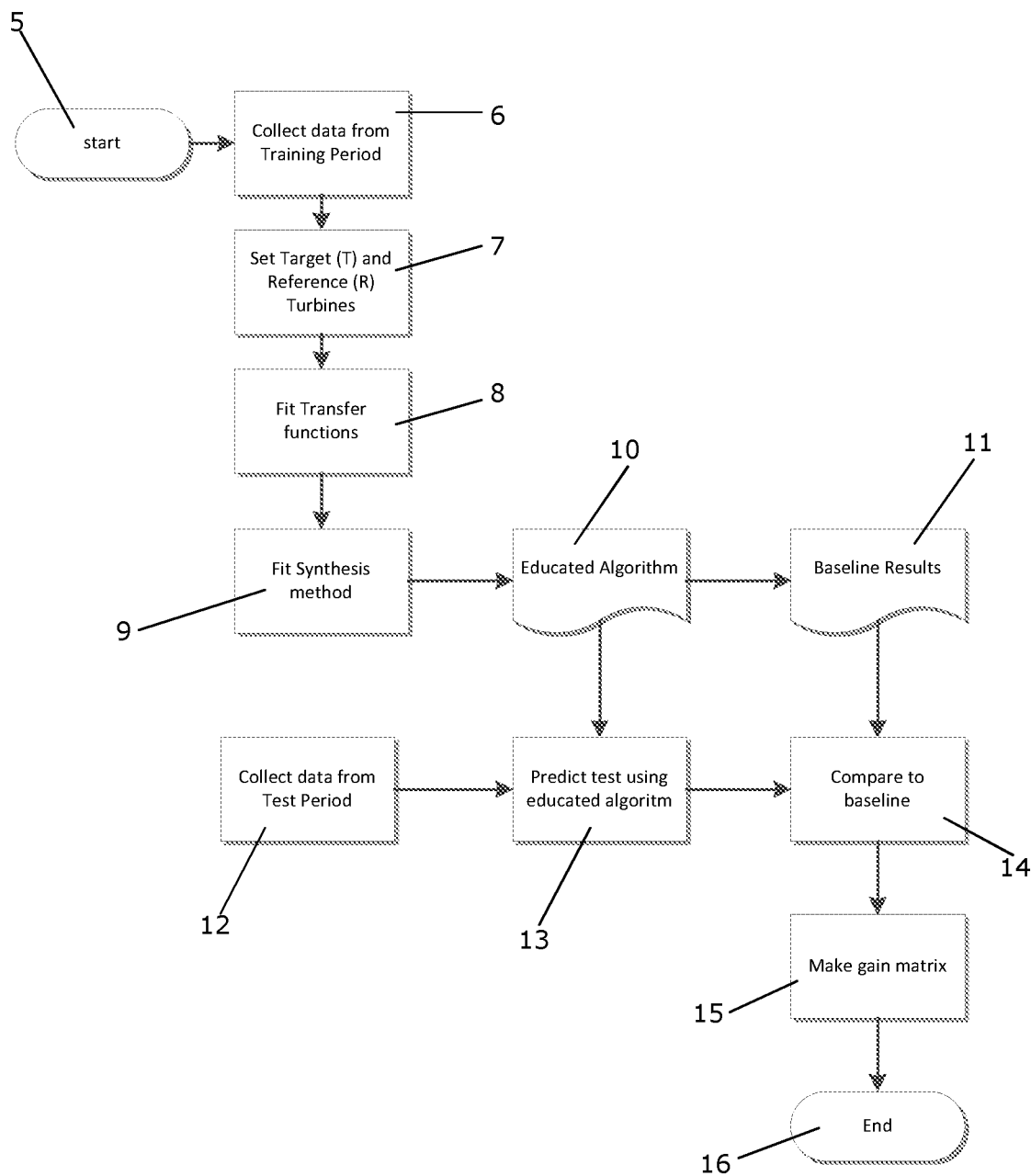
FIG. 3 is a flow chart illustrating a method according to an embodiment of the invention.

FIG. 3 is a flow chart illustrating a method according to an embodiment of the invention. The process is started at step 5. At step 6, wind speed data is locally measured at a number of wind turbines of a wind farm, i.e. wind speed data is collected.

At step 7, the wind turbines of the wind farm are divided into a group of target wind turbines and a group of reference wind turbines, and the collected wind speed data is marked accordingly as being associated with a target wind turbine or a reference wind turbine, depending on the group which the target wind turbine, from which the wind speed measurements originate, is associated with.

It should be noted that steps 6 and 7 could be performed in a reversed manner, i.e. the wind turbines may be divided into a group of target wind turbines and a group reference wind turbines before the wind speed data is collected.

At step 8, a transfer function is generated for each of the target wind turbines, based on the collected wind speed data, and a step 9 a synthesis method is fitted to the transfer function and the wind speed data. Each transfer function establishes a relationship between the locally measured wind speeds at the target wind turbine, and the locally measured wind speeds at each of the reference wind turbines. This results in an educated algorithm, at step 10.

At step 11, baseline results for the power performance of the target wind turbines are generated.

At step 12, wind speed data is once again collected from at least the reference wind turbines, following a power upgrade performed on the target wind turbines. At step 13, expected power performance of the target wind turbines is predicted, based on the wind speed data collected at step 12 and using the educated algorithm of step 10. The predicted power performance of the target wind turbines is compared to the baseline results obtained at step 11, at step 14.

Based on this comparison, the impact of the power upgrade performed on the target wind turbines is assessed, at step 15, before the process is ended at step 16.

The invention claimed is:

1. A method for assessing performance impact of a power upgrade of one or more wind turbines of a wind farm, the method comprising:
    dividing at least some of the wind turbines of the wind farm into a group of target wind turbines and a group of reference wind turbines,
    operating the wind turbines of the wind farm, while obtaining locally measured wind speeds at each of the wind turbines,
    for each of the target wind turbines, generating, using a hardware processor, a transfer function establishing a relationship between the locally measured wind speed at the target wind turbine and the locally measured wind speeds at each of the reference wind turbines,
    performing a power upgrade of each of the target wind turbines but not the reference wind turbines,
    operating the wind turbines of the wind farm, while obtaining locally measured wind speeds, at least at the reference wind turbines,
    obtaining, using the hardware processor, power performance data for each of the reference wind turbines, within one or more wind speed intervals, based on locally measured wind speeds at the reference wind turbines,
    obtaining, using the hardware processor, power performance data for each of the target wind turbines, within the one or more wind speed intervals, based on estimated wind speeds obtained by means of locally measured wind speeds at each of the reference wind turbines and the previously generated transfer functions for each of the target wind turbines,
    comparing, using the hardware processor, the obtained power performance data for the reference wind turbines and for the target wind turbines, and
    assessing, using the hardware processor, a performance impact of the power upgrade, based on the comparison.

2. The method according to claim 1, wherein performing the power upgrade comprises performing a hardware upgrade or a software upgrade of the target wind turbines.

3. The method according to claim 1, wherein generating the transfer function comprises training a learning algorithm.

4. The method according to claim 1, wherein generating the transfer function is performed using a linear regression method.

5. The method according to claim 1, wherein the group of target wind turbines comprises at least two target wind turbines or the group of reference wind turbines comprises at least two reference wind turbines.

6. The method according to 1, wherein the group of target wind turbines and the group of reference wind turbines in combination includes substantially all of the wind turbines of the wind farm.

7. The method according to claim 1, wherein the number of target wind turbines is substantially equal to the number of reference wind turbines.

8. The method according to claim 1, wherein the target wind turbines and the reference wind turbines are spatially distributed among each other within the wind farm.

9. The method according to claim 1, wherein the estimated wind speeds, obtained by means of locally measured wind speeds at each of the reference wind turbines and the previously generated transfer functions, are obtained using a synthesis function reducing the estimates for each reference wind turbine to each target wind turbine to one estimate.

10. The method according to claim 9, wherein the synthesis function is an average or a weighted average per wind speed interval.

11. The method according to claim 1, further comprising, for each of the target wind turbines, generating a power transfer function establishing a relationship between the obtained power performance data of the target wind turbine and the power performance data of each of the reference wind turbines.

12. The method according to claim 1, wherein obtaining power performance data for the reference wind turbines comprises obtaining annual energy production data for the reference wind turbines or the step of obtaining power performance data for the target wind turbines comprises obtaining annual energy production data for the target wind turbines.

13. The method according to claim 1, wherein generating the transfer function comprises generating transfer functions for one or more wind direction sectors.

14. The method according to claim 1, further comprising-combining power performance data from two or more target wind turbines, thereby increasing statistical strength of the assessment of performance impact of the power upgrade.

15. The method according to claim 1, wherein performing the power upgrade of each of the target wind turbines comprises performing a first power upgrade of a first target wind turbine and performing a second power upgrade of a second target wind turbine, the first power upgrade being of a different type than the second power upgrade.

16. The method according to claim 1, further comprising-performing the power upgrade on each of the reference wind turbines in the case that assessing the performance impact of the power upgrade reveals that the power upgrade results in an improvement of the performance of the target wind turbines.

17. A program product comprising a non-transitory computer readable medium containing instructions which, when executed by a processor, perform an operation, comprising:
    obtaining locally measured wind speeds at each of a plurality of wind turbines during operation of the plurality of wind turbines, wherein the plurality of wind turbines include a group of target wind turbines and a group of reference wind turbines;
    for the target wind turbines, generating a transfer function establishing a relationship between the locally measured wind speed at the target wind turbine and the locally measured wind speeds at each of the reference wind turbines;
    after performing a power upgrade of each of the target wind turbines but not the reference wind turbines:
        obtaining locally measured wind speeds, at least at the reference wind turbines;
        obtaining power performance data for each of the reference wind turbines within one or more wind speed intervals, based on the locally measured wind speeds at the reference wind turbines;
        obtaining power performance data for each of the target wind turbines within the one or more wind speed intervals, based on estimated wind speeds obtained from locally measured wind speeds at each of the reference wind turbines and the previously generated transfer functions for each of the target wind turbines;
        comparing the obtained power performance data for the reference wind turbines and for the target wind turbines; and
        assessing a performance impact of the power upgrade, based on the comparison.

18. The program product of claim 17, wherein generating the transfer function comprises one of: training a learning algorithm and using a linear regression method.

19. The program product of claim 17, wherein the estimated wind speeds, obtained from the locally measured wind speeds at each of the reference wind turbines and the previously generated transfer functions, are obtained using a synthesis function reducing the estimates for each reference wind turbine to each target wind turbine to one estimate.

20. The program product of claim 17, the operation further comprising combining power performance data from two or more target wind turbines, thereby increasing statistical strength of the assessment of performance impact of the power upgrade.

* * * * *